United States Patent

Albright

[15] 3,673,948

[45] July 4, 1972

[54] MULTIPLE FACILITIES FOR ASSEMBLING COOKING AND DISPENSING FOOD-PRODUCTS

[72] Inventor: Charles Jere Albright, 313 W. North Ave., Chicago, Ill. 60610

[22] Filed: Jan. 25, 1968

[21] Appl. No.: 700,608

[52] U.S. Cl. ............................................. 99/355, 99/393
[51] Int. Cl. ............................................. A47j 37/08
[58] Field of Search .................. 99/352, 356, 373, 443, 355, 99/391, 392, 393, 394, 396, 399, 402, 407; 107/1.6, 1.65; 214/6 K; 126/41

[56] References Cited

UNITED STATES PATENTS

| 1,848,104 | 3/1932 | Brand | 99/334 |
| 2,614,483 | 10/1952 | Scofield | 99/393 |
| 2,626,575 | 1/1953 | Whitsel | 107/1 |
| 2,718,188 | 9/1955 | Read et al. | 99/386 |
| 2,917,990 | 12/1959 | Ehrenberg | 99/386 |
| 3,158,086 | 11/1964 | Weimer | 99/423 |
| 3,193,663 | 7/1965 | Budzich et al. | 219/405 |
| 3,266,442 | 8/1966 | Udall et al. | 99/386 |
| 3,343,689 | 9/1967 | Fehely | 214/6 |

FOREIGN PATENTS OR APPLICATIONS

| 19,864 | 1898 | Great Britain | 99/443 |

Primary Examiner—Billy J. Wilhite
Attorney—Shoemaker & Mattare

[57] ABSTRACT

The essential concept of this invention involves one or two facilities each comprising a pair of superimposed, relatively-shiftable elements and each facility being structured to have positioned thereon an ordered arrangement of portioned food-products subject to their being transferred, in the same ordered arrangement, onto an under-positioned support as a result of the relative shifting of the respective pair of elements; the facilities being adapted for use individually or collectively to position an ordered-arrangement of food-serving components on the under-positioned support and subsequently having the same ordered-arrangement of portioned cooked food-products superimposed on the previously-arranged food-serving components on the under-positioned support.

10 Claims, 12 Drawing Figures

PATENTED JUL 4 1972 3,673,948
SHEET 1 OF 3
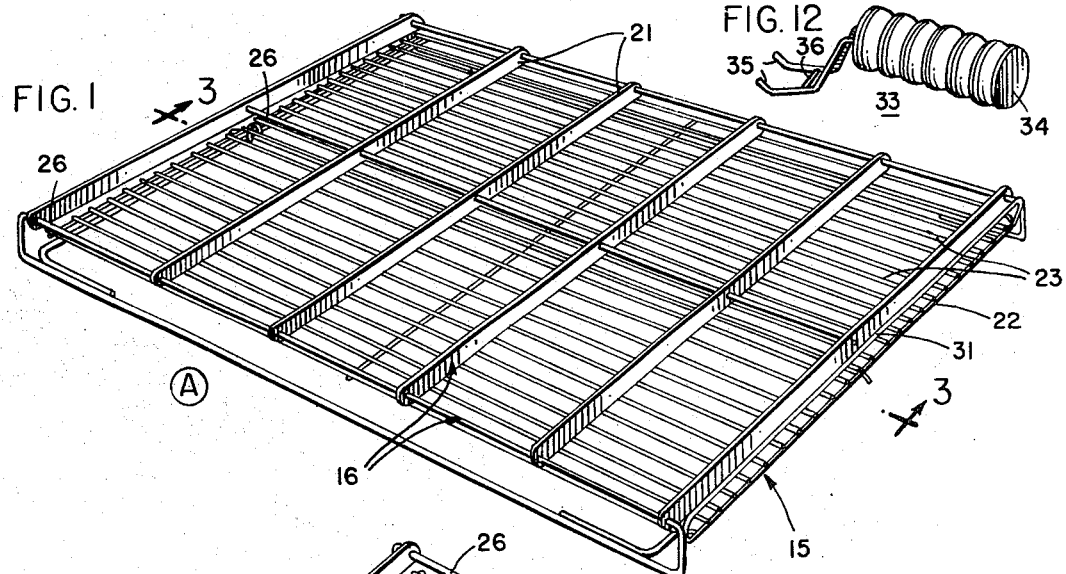
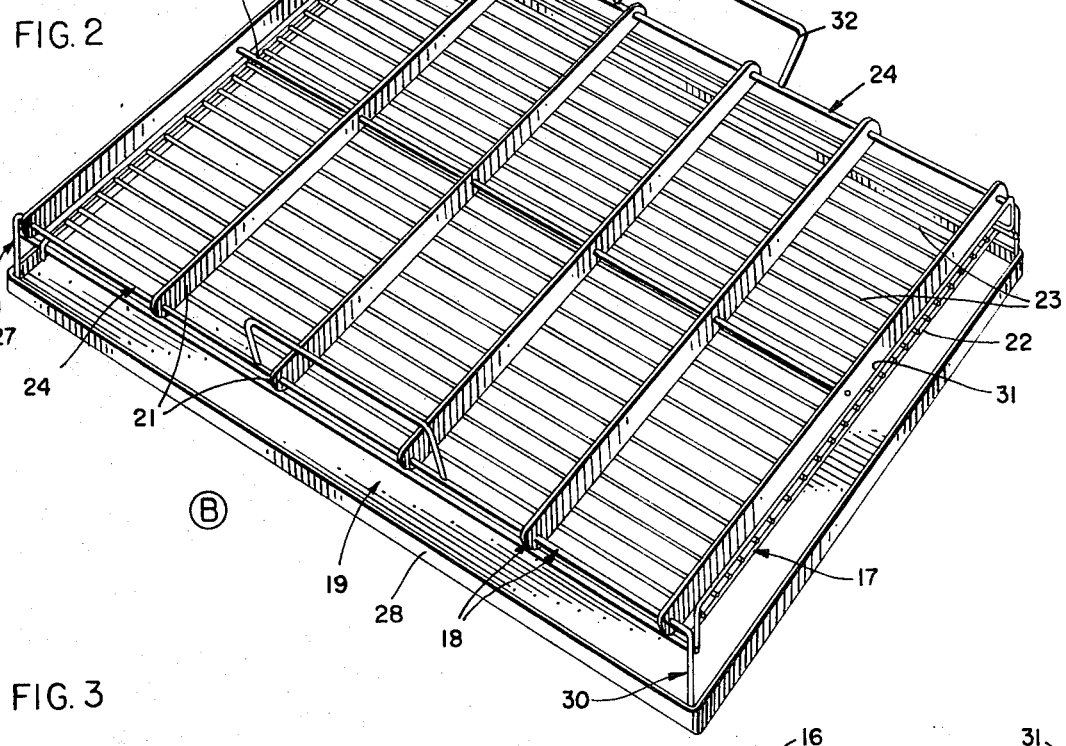
INVENTOR:
CHARLES JERE ALBRIGHT
BY
Edwin Phelps
ATT'Y

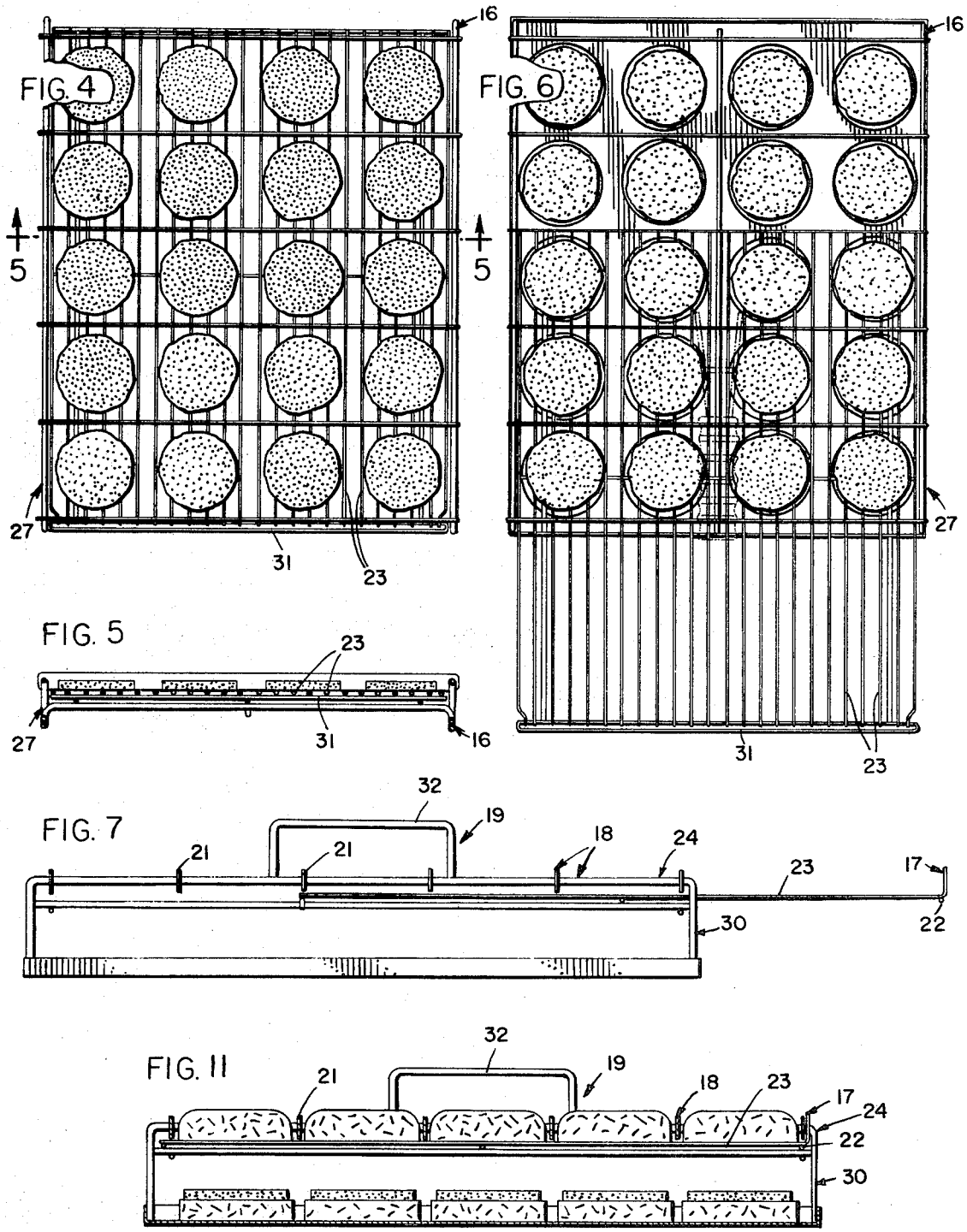

INVENTOR:
CHARLES JERE ALBRIGHT
BY
ATT'Y

MULTIPLE FACILITIES FOR ASSEMBLING COOKING AND DISPENSING FOOD-PRODUCTS

There are two well-known types of situation where the cooking of portioned food-products—especially meat—for mass groups of patrons present a great problem. One of these is the large catering operations for banquets. The other type is the restaurants and/or drive-in stands along the highways of the nation. In either of these operations, the current practice involves the placing of the food-products in or on heated cooking units, successively reversing the food-products to complete the degree of desired cooking, and then successively removing the cooked food-products for manual positioning on serving components. This latter may be plates for the banquets or bread-products generally required for dispensing sandwiches.

The main objects of this invention are; to provide an improved dual-element food-processing facility adapted to have positioned thereon an ordered arrangement of portioned food-products subject to having them transferred, in the same ordered-arrangement, onto an under-positioned support as a result of the relative shifting of the dual elements; to provide a facility of this kind which first may be used to have positioned thereon an ordered-arrangement of food-serving components subject to their being transferred to the under-positioned support and, subsequently, adapted to have positioned thereon another type of portioned food-product, in the same ordered arrangement, subject to being cooked thereon and then being transferred to the previously-transferred food-serving components, by the relative shifting of the dual elements, and later, have positioned thereon, in the same ordered-arrangement, complementary food-serving components to be transferred onto the cooked food-products, as the result of another relative shifting of the dual elements; to provide a dual-element facility of this kind wherein one element has a transverse series of strips, disposed in the spaces between the rows of food-products, whereby the relative shifting of the elements effects the successive transfer of the rows of food-products onto the under-positioned support; to provide a dual-element facility of this kind wherein the other element has a series of spaced wires, transversely-arranged with respect to the strips on the one element, for supporting the respective food-products; to provide a dual-element facility of this kind especially structured for use in inserting into the horizontally-disposed, elongated opening of a food-cooking apparatus of the type shown in the co-pending U.S. Pat. application Ser. No. 682,033 now abandoned; to provide a pair of dual-element facilities of this kind wherein one is structured especially for transferring therefrom the ordered-arrangement of the food-serving components and the other facility is structured especially for the cooking of the meat-type food-products subject to the later transferring thereof onto the food-serving components; and to provide dual-element facilities of this kind of such simple construction as to make highly economical the manufacturing and marketing thereof and exceedingly facile and gratifying the use thereof by purchasers.

In the adaptation shown in the accompanying drawings;

FIG. 1 is a perspective view of the presently-preferred structure of one of the two dual-facilities;

FIG. 2 is a similar perspective view of the other dual-facility, positioned above a tray-type support for food-serving components;

FIG. 3 is a side elevational view of the facility shown in FIG. 1 with the elements in the process of being relatively shiftable for the purpose of transferring positioned rows of food-products onto an under-positioned support;

FIG. 4 is a plan view of the facility shown in FIG. 1 with a plurality of rows of food-products positioned thereon;

FIG. 5 is a transverse, sectional view of the facility of FIG. 4 taken on the plane of the line 5—5;

FIG. 6 is a plan view of the facility of FIG. 4 with the food-supporting element in the process of being withdrawn to effect the transfer of the successive rows of food-products onto food-serving components previously and similarly positioned on an under-positioned support;

FIG. 7 is a side elevational view of the facility shown in FIG. 2 in the process of the elements being relatively shifted for the purpose of transferring the positioned rows of food-products

FIG. 11 is a lateral, medial view of the food-supporting facility of FIG. 9 positioned above the support of FIG. 8 preparatory to having the rows of supplementary food-serving components transferred to the products on the support; and FIG. 12 is a perspective view of a type of handle needed for use in transferring a hot facility of cooked food-products over onto an under-positioned support.

Figure 10:
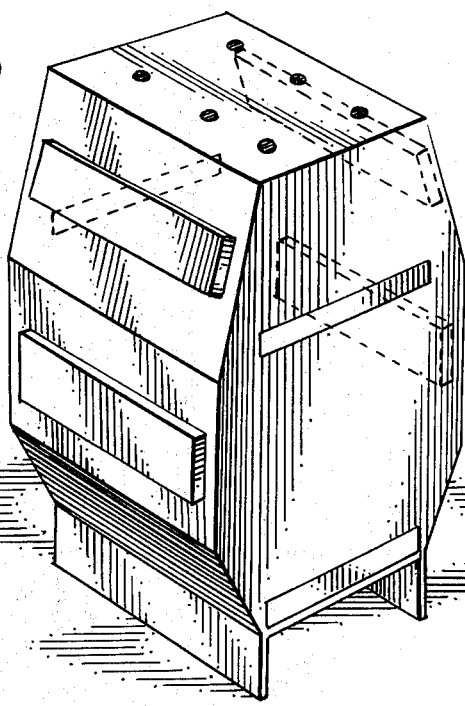
FIG. 10 is a perspective view of one type of food-broiling apparatus especially structured for use with the dual-element facility of FIGS. 1 and 4.

The herein-shown multiple facilities A and B, for processing portioned food-products and embodying the foregoing concept, comprise the respective pairs of dual-elements 15 and 16 and 17 and 18 and which are respectively structured to permit positioning on the elements 15 and 17 pre-arranged rows of one or another type of portioned food-product subject to their being transferred, in the same pre-arranged rows, onto an under-positioned support 19, as a result of the relative shifting of the respective dual-elements of the respective facilities A and B.

The elements 15 and 17 are structured to provide a horizontal, planar support for rows of portioned food-products. The respective elements 16 and 18 are structured with a series of segments 21 disposed transversely of the elements 15 and 17 which effect the transfer of the respective portioned food-products onto the under-positioned support 19 as a result of the relative shifting of the respective elements 15 and 16 and 17 and 18.

The elements 15 and 17, as herein shown are, respectively, in the nature of a rod-frame 22 spanned by a series of closely-spaced parallel wires 23 anchored at their opposite ends to the transverse portions of the frame 22. The elements 16 and 18, as herein shown, likewise are in the nature of a rod-frame 24 similarly spanned by a few widely-spaced wires 26 anchored at their ends to portions of the frame 24. However, these latter wires 26 are of slightly larger gage than the wires 23 for the frame 22. To these latter wires 26 are anchored the segments 21, shown herein as narrow, flat strips. These strip-segments 21 are disposed transversely of the wires 26 of the frame 24 uniform distances as may be determined by the nature of the portioned food-products wherewith these facilities A and B are to be used.

Although these planar-support elements 15 and 17 herein are shown and described above as wire structure, it should be understood that some types of such a facility may have such a planar support in the form of a flat sheet of suitable material.

The elements 16 and 18 of each facility A and B also have appropriate spacers 27 for resting on the under-positioned support 19, to dispose the facility the appropriate distance above the support 19. The form and height of these spacers 27 are different for the respective facilities A and B.

The support 19 here is shown as a tray with upstanding perimetrical flanges 28. The dimensions of such a tray would be determined by the size of the facilities A and B. The important factor is that it be such as will ensure the corner posts seating in the corners of the tray as indicated in FIG. 2.

The segments 21, as most clearly shown in FIGS. 1 and 2, are narrow strips of suitable material anchored to the series of wires 26.

In the facility A these spacers 27 are horizontally-disposed, elongated "C" contoured rods with upwardly-extending ends 29 anchored to the frame 16. These serve as "runners" for the facile sliding insertion of the facility into and withdrawal from a broiler of the type hereinbefore noted.

Figure 9:
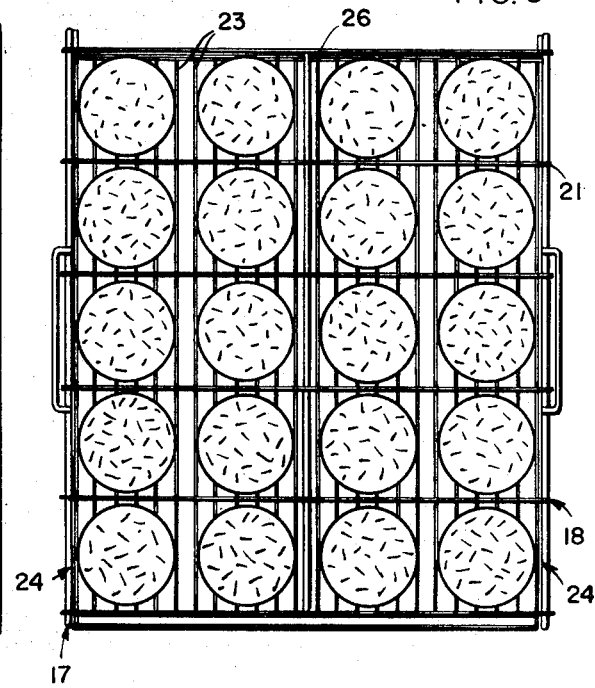
FIG. 9 is a plan view of the facility of FIG. 2 showing a plurality of similarly-arranged rows of supplemental food-serving components positioned thereon preparatory to being placed over the food-product support of FIG. 8 for the transfer of the supplemental food-serving components onto the food-products on the under-positioned tray.

In the facility B these spacers 27 are posts 30 anchored at the four corners of the frame 24. Such posts 30 are of lengths somewhat greater than the end parts 29 of the "C"-contoured rods for the facility A. This facility B also has a pair of oppositely-arranged handles 32 (FIGS. 2, 9 and 11). These similarly-structured elements 15 and 17, of the facilities A and B have grips 31 in the form of looped rods, fixed at one end (FIGS. 1 and 2) for effecting the requisite shifting of these elements as indicated in FIGS. 3, 6 and 7. Such two facilities A and B are structured thusly different for the reason that they are required for the most expeditious use in assembling two different types of food-product for dispensing to waiting patrons.

The facility A is intended, normally, for use in broiling meat patties—especially hamburgers—in a type of broiling apparatus such as indicated in FIG. 10, or in other types of unit as shown and described in copending U.S. Pat. application Ser. No. 682,033. However, it will be understood that such a facility could be used in any type of broiler providing for the horizontal disposition of the facility.

The facility B is intended, normally, for use in positioning bread-type food-supporting components—especially lower- and upper-half buns—in a manner as will be explained presently.

Since the facility A is used for broiling food-products, it is advantageous to provide a tool 33 (FIG. 12) for removing the heated facility A from the broiler and locating it over a food-support 19. As shown in FIG. 12, this tool has a ribbed, cylindrical handle 34 to which is anchored a two-pronged hook 35 spanned by a bridge 36. Such a tool is used, as shown in dotted outline in FIG. 6, where the two-pronged hook 35 is inserted under one of the transverse segments 21 with the bridge 36 resting on the middle wire 26. Thusly positioned, a firm grasp of the handle 34 permits picking up the facility A and positioning it as shown in FIGS. 6 and 11 over the under-positioned support 19.

The operational use of these facilities A and B will be accommodated to the conditions obtaining at the time. Obviously, there are occasions when the demand for just cooked-meat patties is great. Wayside stands and banquets are two such types. For either of such circumstances a plurality of the facility A can have the meat-patties arranged thereon as shown in FIG. 4. Such "loaded" facilities can be stacked in conventional castored racks and wheeled into a refrigerator pending the time when the cooked products will be needed.

When the time comes for a fast dispensing of such food-products, the loaded racks can be wheeled out adjacent a broiler complex. In rapid succession the loaded facilities A can be withdrawn from the racks and successively inserted into a broiler. Upon their withdrawal from the broiler, with the cooked-products, these facilities can be positioned over supports 19 whereon the food-serving components have been prearranged. Thereupon, the cooked food-products can be instantly transferred to the under-positioned food-serving components. All that is required is for the attendant to grasp the grip 31 and quickly withdraw the element 15, as indicated in FIG. 6.

Figure 8:
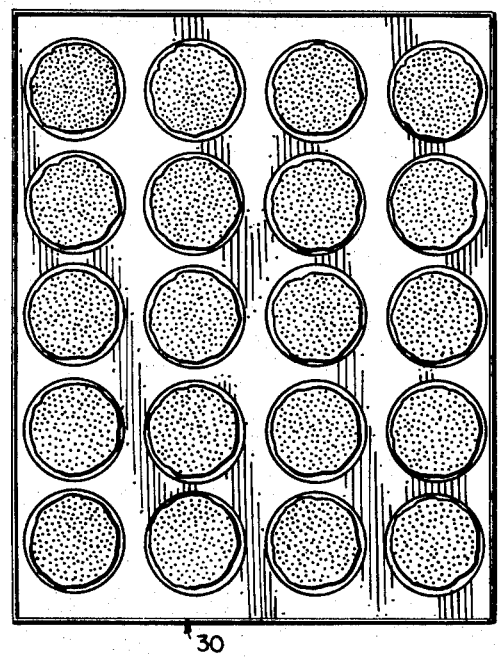
FIG. 8 is a plan view of the under-positioned support of FIG. 6 after the facility has been removed.

This shifting of the element 15 relative to the element 16 causes the stationary segments 21 to slide the successive rows of cooked products along the element 15 for dropping on the prearranged serving components as illustrated in FIG. 6. The result is indicated in FIG. 8, namely, cooked meat-patties resting on the lower-half of sandwich buns.

If, as indicated in the drawings, these facilities A and B are used for dispensing hamburger sandwiches, then, while a batch of meat-patties are being cooked, an attendant can be loading one or more facilities B with the upper half of buns as shown in FIG. 9. Then, as soon as the facility A has had its cooked-patties transferred to the lower-half buns, the facility B, with the upper-half buns, can be superimposed over the support 19 of the facility as shown in FIG. 1. Upon the withdrawal of the element 17 these upper-half buns will be dropped instantly onto the meat patties. Thereupon a battery of sandwiches are ready for dispensing to the waiting patrons.

Variations and modifications in the details of structure and arrangement of the parts may be resorted to within the spirit and coverage of the appended claims.

I claim:

1. Food preparing apparatus for use with a broiler and for simultaneously stripping a plurality of meat patties off their grill and onto their respective, prepositioned bun halves, said apparatus comprising; a grill on which said patties are positioned in rows for broiling, a stripper frame having a number of parallel blades extending thereacross and between said rows of patties, said grill slidable beneath and relative to said blades, said frame adapted to be positioned over a bun pan having bun halves prepositioned thereon, one half beneath each patty, whereby said grill can be slid relative to said frame and thereby cause said patties to abut against their respective blades and be pushed off said grill due to grill movement and onto their respective bun halves.

2. A food processing facility for use in dispensing food products comprising, a frame, a first supporting element having the food products thereon in horizontal rows and in spaced relationship, the first supporting element being shiftable relative to said frame, a plurality of horizontal elements on the frame and positioned above the first supporting element, the horizontal elements being between the horizontal rows of the food products, a second separate supporting element placed under the frame, whereby upon shifting of the first supporting element relative to the frame the horizontal rows of the food products are deposited onto the second supporting element in the horizontal rows and in substantially the same spaced relationship 3. The facility as set forth in claim 2 wherein the frame has side members supporting the same, the horizontal elements being mounted on the side members in spaced relationship to each other.

4. The facility as set forth in claim 3 wherein the side members have intermediate supports upon which the first supporting element is slidably mounted.

5. The facility as set forth in claim 2 wherein the first supporting element is slidably supported on the frame.

6. The facility as set forth in claim 2 wherein the first supporting element comprises a series of parallel wires within a wire frame.

7. The facility as set forth in claim 2 wherein the frame and the first supporting element with the food products thereon support the food products while the frame is inserted into a cooking facility and the cooked food products are transferred to the second supporting element.

8. The facility as set forth in claim 2 wherein the second supporting element is adapted to receive a series of food supporting elements thereon placed in the same spaced relationship as the food products on the first supporting element, the food products being deposited onto the food supporting elements when shifting the first supporting element relative to the frame.

9. The facility as set forth in claim 8 wherein the series of food supporting elements are bread products.

10. The facility as set forth in claim 2 wherein the frame has side members supporting the same, the horizontal elements being mounted on the side members in spaced relationship, the first supporting element comprising a series of parallel wires within a wire frame and slidably supported on the frame.

* * * * *